United States Patent
Talbert et al.

(10) Patent No.: US 8,910,182 B2
(45) Date of Patent: Dec. 9, 2014

(54) MANAGING AND SIMPLIFYING DISTRIBUTED APPLICATIONS

(75) Inventors: Nathan Talbert, Seattle, WA (US); John Taylor, Bellevue, WA (US); Stefan Batres, Sammamish, WA (US); Justin Brown, Seattle, WA (US); Kenneth Wolf, Seattle, WA (US); Edmund Pinto, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 129 days.

(21) Appl. No.: 13/118,095

(22) Filed: May 27, 2011

(65) Prior Publication Data

US 2012/0304197 A1 Nov. 29, 2012

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/48 | (2006.01) |
| G06F 9/54 | (2006.01) |

(52) U.S. Cl.
CPC ............... *G06F 9/485* (2013.01); *G06F 9/546* (2013.01)
USPC .......................................................... 719/313

(58) Field of Classification Search
None
See application file for complete search history.

(56) References Cited

U.S. PATENT DOCUMENTS

| | | | |
|---|---|---|---|
| 6,772,216 B1 | 8/2004 | Ankireddipally et al. | |
| 7,103,874 B2 | 9/2006 | McCollum et al. | |
| 7,451,211 B2 * | 11/2008 | Cabrera et al. | 709/224 |
| 7,587,638 B2 * | 9/2009 | Shah et al. | 714/47.3 |
| 7,676,580 B2 * | 3/2010 | Hill et al. | 709/227 |
| 8,156,179 B2 * | 4/2012 | Parmar et al. | 709/203 |
| 2004/0226013 A1 | 11/2004 | Mariotti et al. | |
| 2006/0206558 A1 | 9/2006 | Cohen et al. | |
| 2007/0078988 A1 | 4/2007 | Miloushev et al. | |
| 2008/0256531 A1 | 10/2008 | Gao et al. | |
| 2009/0016323 A1 * | 1/2009 | Ethier et al. | 370/352 |
| 2009/0055838 A1 | 2/2009 | Sedukhin et al. | |
| 2010/0036859 A1 * | 2/2010 | Pinto et al. | 707/100 |

OTHER PUBLICATIONS

Simon, Dr. Robert, et al., "Agents for enhanced end-host multicasting in distributed simulation systems," Retrieved Apr. 4, 2011 (26 pages).
Mhaswade, Kedar, "Clustering in GlassFish Version 2," http://developers.sun.com/appserver/reference/techart/glassfishcluster/, Retrieved Apr. 4, 2011 (11 pages).

(Continued)

*Primary Examiner* — H S Sough
*Assistant Examiner* — William C Wood
(74) *Attorney, Agent, or Firm* — Benjamin Tabor; Katherine Drakos; Micky Minhas (57) ABSTRACT

A distributed instance system manages instances and communications between the instances. The distributed instance system provides a restricted set of communication methods to the instances. Based on the type of communication method used, the distributed instance system has knowledge of the messages sent by instances and can make decisions on how to handle the messages. When one of the instances involved in a message exchange ends, the host uses its knowledge of the message exchange type to determine whether to drop the message, drop a reply to the message, and/or send an error message to the surviving instance. An instance may create one or more child instances in a tree-like configuration. Status data is passed up the tree from children instances and aggregated in the parent instances. Monitoring data may be generated from the aggregated status data.

20 Claims, 3 Drawing Sheets

(56) References Cited

OTHER PUBLICATIONS

Joseph, Joshy, "Patterns for High Availability, Scalability, and Computing Power with Windows Azure," http://msdn.microsoft.com/en-us/magazine/dd727504(printer).aspx, Retreived Apr. 4, 2011, Published May 2009 (9 pages).

King, Brad, "Simplify Distributed System Design Using the Command Pattern, MSMQ and .NET," http://msdn.microsoft.com/en-us/magazine/cc163920(printer).aspx, Retrieved Apr. 4, 2011, Published Sep. 2004 (9 pages).

Cisco, "Virtualize Microsoft Enterprise Applications (Exchange, Sharepoint, and SQL Server) on FlexPod for VMware," Brochure, 2011.

"International Search Report", Mailed Date: Nov. 29, 2012, Application No. PCT/US2012/038664, Filed Date: May 18, 2012, pp. 9.

\* cited by examiner

MANAGING AND SIMPLIFYING DISTRIBUTED APPLICATIONS

BACKGROUND

Large distributed applications are complex to manage. In particular, a significant amount of manual intervention is required to deal with the unreliable nature of distributed communications. This problem is exacerbated for very large scale applications that may run millions of processes that exchange many millions of messages. Traditionally, these large scale applications require human intervention from system administrators to manually compensate and correct failed processes. Additionally, these applications require an extensive infrastructure that support this intervention, such as dead-letter queues and suspended process reporting.

Problems may arise, for example, when two applications, such as two components of a business process, exchange messages. The applications may exchange messages through a broker. A sending instance may require a response to a message that is sent to a destination instance. However, if the destination instance ends before receiving the message, the message will sit in the broker. As a result, the sending instance never receives a response and, therefore, becomes stalled. When a large distributed application is running millions of processes, thousands of unroutable messages may collect in the broker. A system administrator must manually clean up these unroutable messages and restart stalled processes. For very large distributed applications, the scale becomes too large for human operators to manage these unrouted messages, stalled processes and similar issues.

These problems are not just an issue for large applications, but also arise in small applications. Additionally, these problems arise when using brokered messaging and when using correlated, one-way point-to-point messaging. Other high-scale scenarios, such as a large number of small hosted applications, may also need to address these issues.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This solution reduces administrative overhead by providing system developers with an enhanced distributed instance system that allows applications to be represented as a number of instances. The instances communicate only through a restricted set of message exchange patterns. The system is aware of all of the individual instances and of the lifetime of each of these instances. Through the combination of instance-lifetime awareness and the restricted message-exchange patterns, the system can make appropriate decisions about how to handle failures. This creates an extremely low cost programming platform, suitable even for end-user applications that traditionally have no active human administration role. In addition, the distributed instance system offers an ideal platform for creating very large systems that leverage the eventual consistency inherent in the messaging system, are optimized for the absence of distributed transactions, and that have the scalability requirements of multi-tenant, high-density cloud computing.

The distributed instance system may be embodied as an execution environment, distributed runtime, distributed management environment, distributed management and execution system or other platform that provides lifetime management of instances. The system may be realized on a single machine or may be virtualized across multiple machines, servers or processors.

The instances comprise a combination of behavior and associated state. An application's state may be broken down into a series of instances, wherein the individual instances represent concrete artifacts of the application's problem domain. The instances may communicate with other instances. The instances may have an explicit lifetime, such as an explicit beginning and an end. The existence of the instances and the lifetime of the instances in the system may be externally visible and may be externally managed.

Embodiments may use an instance manager, which acts as an enhanced broker, in the distributed instance system to manage communications between instances. In prior systems, a broker managed communications, but had no knowledge of the message exchange pattern being used by applications. In the present system, the instance manager has more knowledge of the instance communications than was available in previous distributed systems. Additionally, the instance manager is aware of the instances' lifetime and may manage the communications based on this knowledge of an instance's lifetime. For example, the instance manager may manage communications between two instances, A and B. Instance A sends a message to instance B and includes information about the message that can be used by the instance manager to make decisions about the message. For example, instance A may identify the message as the first leg of a request-reply exchange.

In a traditional brokered system, if instance A ended before receiving a reply from instance B, then the reply message would be held in a dead-letter queue. A network administrator would have to manually clear the reply message from the dead-letter queue. In the case of very large scale applications, there may be thousands of messages in the dead-letter queue and the human network administrator would have to analyze and eliminate each of those messages. Additionally, in the case of a large number of applications, there may be thousands of message queues to manually monitor and maintain in this fashion.

In embodiments of the system disclosed herein, the distributed instance system has information about the message exchange—i.e. that it is a request-reply. Therefore, the instance manager may make decisions on how to handle the messages based upon the intended use of the message. If the distributed instance system knows that the message was the reply part of a request-reply exchange, and that the requesting instance A is done or is no longer interested in the reply, then the distributed instance system can just eliminate the reply message instead of attempting to deliver it to instance A. Since instance A is done, it does not care to or need to receive the reply message from instance B, as it would simply discard it as noise.

Similarly, if instance B has completed before receiving the request message from A, the distributed instance system, which has information about the message exchange, can make decisions on how the instance manager should handle the request message. Rather than holding on to the request message as an undeliverable letter and/or continuing to attempt delivery to instance B, the instance manager may send an error message to instance A. Instance A may have message error-handling intelligence so that it can deal with the failure of the request message without stalling or waiting for the reply from instance B, which will never arrive.

In one embodiment, an enhanced, distributed instance system manages instances, is aware of the instances' lifetimes, and provides a restricted set of message exchange patterns between the instances. By leveraging the restricted set of message exchange patterns, the system can eliminate or reduce the need for user management. Request-reply messages allow for reliable asynchronous request-reply communication between instances. Furthermore, conversations are a mechanism for supporting a reliable and asynchronous full-duplex messaging exchange pattern between instances.

A distributed instance system may structure instances into one or more hierarchical trees. This allows the system to manage states cohesively and reduce administrative overhead. The organization of instances into a hierarchical tree enables a reduction in the administrative complexity associated with managing the instances in a very large distributed application. For example, a large business process may be comprised of multiple asynchronous business transactions. The hierarchical organization of instances enables management of the large business process. Additionally, the instances can be organized to provide isolation to protect business process information where necessary. A program may be partitioned into multiple distributable states that can be highly parallelized. Furthermore, instances' processing logic definitions can be late bound and independently versioned.

The system runs the application instances and provides a restricted set of message exchange patterns to the instances. A storage device holds instance state and messages. The storage device may be physically located in one or more multiple machines, spread across one or multiple processes. An instance manager supports the restricted message exchange patterns.

The restricted set of message exchange patterns allow the system device to identify messages that can be eliminated without a need for user intervention. The restricted set of message exchange patterns allows instances to exchange asynchronous request and reply messages. The instance manager identifies request and reply messages that should be eliminated based upon the lifetime of instances involved in an exchange.

The instances may be organized in a hierarchy in which one instance acts as a parent that creates and/or manages one or more child instances. The hierarchy may have multiple levels in which the children instances generate their own children instances and thereby also operate as parent instances. The child instances may send status reports to their respective parent instances. Each parent instance aggregates status reports from their respective child instances before passing an aggregated status report to a higher level parent instance. Aggregated status reports at any level may be communicated to a management portal.

The instances may include a monitoring instance. Monitoring messages carrying health and status information may be propagated up through a tree of instances. A monitoring instance, either at the root level or at a lower level, may collect the monitoring messages. The instances may be organized to provide a homogeneous view of monitoring information that encapsulates the end-to-end process.

A conversation is a pair-wise association between two instances that is tracked by the distributed instance system. Conversations are established through a handshake involving both participating instances. The handshake is coordinated by the distributed instance system. An instance participating in a conversation is notified when the other instance of the conversation has ended. Either instance may terminate a conversation explicitly, or by terminating itself, thereby implicitly terminating all of its associated conversations. When an instance terminates a conversation, the other instance in the conversation is informed. A conversation is created when instances have a parent-child relationship. This conversation is a side effect of a parent creating a child. When the child completes, the parent-child conversation ends. Outside a parent-child relationship, an instance may initiate a conversation by registering an interest in another instance's lifetime using the handshake procedure coordinated by the distributed instance system. A conversation is a two-party pair-wise relationship that is maintained and understood by the infrastructure. After, the conversation is established, it is symmetrical. When one party ends the conversation, the other is notified. Parent-child is a specific use of a conversation. The parent creates the child and as a side effect of that creation, the parent and child are both part of a conversation. If the child terminates, the parent is informed of the end of the conversation. Similarly, if the parent terminates, the child is informed of the end of the conversation and the child is also terminated.

In another embodiment, a method for managing a plurality of instances comprises initiating a plurality of instances on one or more instance processors, monitoring a lifetime of each of the plurality of instances, and providing a defined set of messages to the plurality of instances.

The method may further comprise providing a request-reply message format for communication between a sending instance and a destination instance, identifying when the destination instance has ended before receipt of a request message, and automatically eliminating the request message. The method further provides an error message to the sending instance when the request message is eliminated.

The method may further comprise providing a request-reply message format for communication between a sending instance and a destination instance, identifying when the sending instance has ended before receipt of a reply message, and automatically eliminating the reply message.

The method may further comprise providing a one-way message format for communication between a sending instance and a destination instance, identifying when the destination instance has ended before receipt of a one-way message, and automatically eliminating the one-way message.

The plurality of instances may be arranged in a hierarchical format in which instances are arranged in multiple levels of parent-child groups. The method may further comprise sending instance status information from children instances to a parent instance, aggregating instance status information for the children instances at the parent instance, sending aggregated status information from the parent instance to a higher parent instance, and providing process status information to a monitoring instance, the process status information comprising the aggregated status information. The aggregated status information may provide a homogeneous view of the end-to-end process associated with the instances.

DETAILED DESCRIPTION

Large computing systems are comprised of multiple distributed applications. The applications are responsible for handling processing logic and executing long-running business processes that may last weeks, months, or even years. The applications are isolated except for access to a shared network. The applications communicate by sending messages over this network. The execution of the processes takes place over a large number of physical computing resources and, therefore, the infrastructure and computing system have to be designed to be fault tolerant. A common solution to this requirement in prior systems was to have all message exchanges take place asynchronously via a broker, which is often implemented as a durable queue. Using asynchronous communication is also commonly applied to systems with long-running business processes.

If a business process that is part of a larger distributed application fails, other business processes in the distributed application can be left awaiting the outcome of the failed process and, as a result, associated messages are left unprocessed. The processes and messages left waiting require human intervention in order to recover or dispose of them in some manner. For example, if a business process fails during a request-reply message exchange, the originating application can be left waiting, unaware of the failure or suspended process. Furthermore, the original request message is left with the broker, which is unable to handle the message other than to flag it as an undeliverable letter. These undeliverable letters usually require human intervention to compensate and correct the failed process and to clean up the broker.

The business processes span multiple applications throughout their lifetime, and these applications typically have different management characteristics. As a result, there is no single, coordinated view of system health, end-to-end process status, or other monitoring data. Instead, system administrators typically deal with a variety of control systems and develop expert knowledge in each.

Because the business processes in such systems often last for long periods of time, when the logic within a business process needs to change, such as due to a company acquisition or change in policy, it is difficult to update the logic without breaking in-flight processes. This problem is traditionally solved by the application developer, who is responsible for implementing complex branching logic to deal with existing partially complete processes.

To address the problems in prior systems, in one embodiment, an enhanced system is responsible for the processing and orchestration of these business processes. By using a restricted and well-understood set of message exchange patterns, the enhanced system makes it possible to eliminate suspended processes and dead-letters, and to reduce the associated management overhead. Furthermore, by organizing the component parts of these processes in a hierarchical manner, it is possible to simplify the management of such systems, thereby providing a single monitoring and control experience that covers the end-to-end process. The cognitive overhead in coordinating parts of a distributed application is reduced by having the system handle complexities such as eventual consistency, failure propagation, and cross-instance correlation.

The component parts of the business processes are manifested at runtime as instances, where an instance represents both the unit of processing logic and its associated state. Instances may be distributed across many processing units without any affinity to a particular one.

Figures 1, 2:
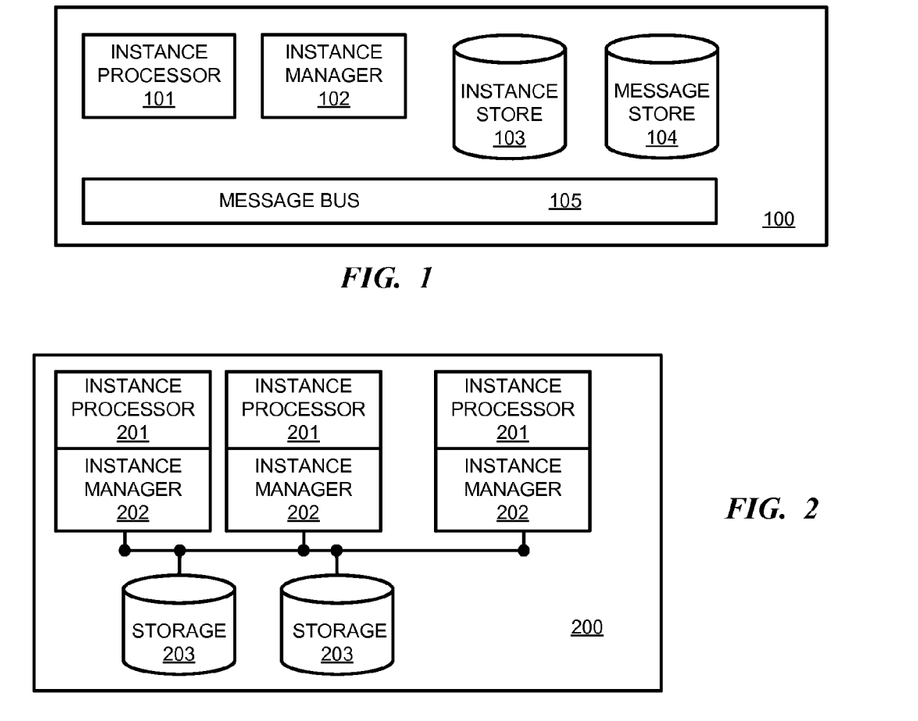
FIG. 1 is a high level block diagram of the components of a distributed instances system according to one embodiment.
FIG. 2 is a high-level block diagram of the topology of a distributed instances system according to one embodiment.

FIG. 1 is a high level block diagram of the components of a distributed instances system 100 according to one embodiment. The distributed instances system comprises one or more instance processors 101, which run instances of an application or process. Instance manager 102 controls instance processor 101 and assigns particular instances to run on instance processor 101. Instance manager 102 also monitors the lifetime of each instance and knows when each instance begins and dies.

The instances and application states may be stored in instance storage 103. Although a single storage device 102 is illustrated in FIG. 1, the distributed instance system 100 may include a plurality of storage devices. In other embodiments, external storage devices may be used in addition to or in place of instance store 103. In one embodiment, each instance is bound to one storage device 103 at a time. The instance-storage binding may be changed as part of rebalancing, failover, or migration, as needed. In further embodiments, storage 103 is optional and the instance states and messages are stored within the instance processor 101, which may cause the system to work at a reduced level of reliability. The use of storage device 103 may be a per-instance decision, wherein some instance states and messages may be externalized to storage while others are not. The instances may communicate with other instances for the same or different applications or processes.

Instances running on instance processor 101 may communicate with each other to allow message to be exchanged between instances. Message store 104 may be used to store messages and message states. Instance manager 102 routes messages to and among the system components, such as between instance processor 101, instance store 103, and message store 104, over message bus 105. Instance manager 102 enforces the message exchange patterns that are available on the distributed instance system.

Instance manager 102 is responsible for executing the instances' processing logic and controlling the instances on instance processor 101. The instance manager also manages the instances' lifetime. Control messages may be exchanged between instance manager 102 and instance processor 101 to create new instances and to terminate existing ones. The instance manager is responsible for implementing these commands and, as a result, is aware of the lifetime of all instances.

The instance manager is also responsible for handling message exchange between instances. The instance manager 102 is provided with additional knowledge about each message, including which instance sent the message and instance (or instances) should receive the message. The instance manager 102 offers a restricted set of messaging patterns, which allows the system to make concrete statements about the behavior of messaging within the system to simplify the system and its administration.

Two primary messaging patterns are Request-reply and One-Way:

Request-reply Messaging Pattern: This pattern is used for asynchronous, request-reply communications between two instances. Since the distributed instance system is aware of the lifetime of both the sender and recipient instances, a number of simplifying attributes are presented by the system. For example, if the recipient instance terminates before sending a reply, the system returns an error response to the sender. This eliminates the suspended business process and dead-letter that would previously have been left with the broker. If the sending instance is terminated before the response is delivered, then the system can discard the reply message. If delivery of the response must be guaranteed, the replying instance (i.e. the original recipient instance) could establish a request-reply exchange with the original sending instance.

One-Way Messaging Pattern: This pattern is used for asynchronous, one-way communication between two instances. The sending and receiving instances may establish a conversation before the one-way message is transmitted. In some cases the one-way message may be bound to a conversation. Conversations are part of the distributed instance system's communication model. Conversations are established via an asynchronous handshake through an instance manager, which may be a durable broker if durability is required. Alternatively, an operation may establish a conversation either as a direct effect or as a side effect. If the receiving instance ends and/or terminates the conversation before the one-way message is delivered, the system discards the message in a manner consistent with most implementations of one-way messaging. However, the system will also inform the sending instance of the conversation's termination.

The Request-reply and One-Way messaging patterns can be composed to create other richer messaging patterns such as Publish and Subscribe.

Instance Hierarchy: The distributed instance system also structures instances into a hierarchy. If an instance A creates a new instance B, instance A automatically becomes the parent of instance B. Instance A may not be able to directly create a new instance, but may instead require the system to mediate the creation of new instances. Similarly, if instance B later creates new instances C and D, instance B automatically becomes the parent of instances C and D, and so on. This relationship among the instances creates a tree of instances. The instances in the tree combine multiple, separate, and distinct pieces of a business process, for example, into a hierarchy that reflects the end-to-end process.

Each child instance may have an automatic conversation with its respective parent instance. Such a parent-child conversation would not require an additional handshake to establish. In some embodiments, the child instance may not be able to terminate the parent-child conversation independently of its own lifetime. Furthermore, the parent instance may be able to force the termination of the child instance by terminating the parent-child conversation.

Instances may also be created on demand. For example, if instance Z sends a message to instance E, but instance E does not yet exist, the distributed instance system may have a function that determines which instance should be the parent of instance E. The system then notifies the prospective parent (for example, instance B above) and then prospective parent instance B has the opportunity to create instance E as a child. Instance E may then receive the message from instance Z. Similarly, if instance B also did not exist, the process may be repeated across multiple levels. For example, instance A may receive a notification from the system to create instance B, and then instance B receives the notification to create instance E.

The hierarchy of nodes for this end-to-end process has a single root. In other embodiments, the hierarchy may have multiple roots. For example, a monitoring instance may also be a root node. This allows the system to provide a unified control model. For example terminating or suspending the parent causes the same control action to propagate to all of its children instances, without having to specifically address each individual instance in the hierarchy. Furthermore, the hierarchy presents an opportunity to aggregate monitoring and health information from the instances. As a result, it is simpler to monitor the end-to-end process. This can be achieved through the use of a third messaging pattern presented by the system—a Monitoring Message Pattern.

Aggregation Messaging Pattern: This pattern is used to asynchronously transmit monitoring data. An instance may emit a monitoring message that is automatically forwarded up the tree of instances—travelling from child instance to parent instance, and then to the parent's own parent instance—until the monitoring message reaches the root instance. Monitoring messages may have timeliness characteristics that are different from other messages. For example, the monitoring messages may have a lower priority than operational messages. In particular, the monitoring messages may be transferred from instance to instance opportunistically, such as by piggybacking on other exchanges in order to improve system efficiency. Any instance may subscribe to this stream of monitoring data, thereby allowing an instance to capture all of the monitoring data for the subscribing instance's part of the hierarchy. This would provide the subscribing instance with a complete picture for any part of the process. Any instance may suppress propagation of monitoring data up the hierarchy. An instance may both publish monitoring data and suppress further propagation of the monitoring data. It will be understood that monitoring is just one example, and that any type of data may be exchanged between instances in addition to or instead of monitoring data.

FIG. 2 is a high-level block diagram of the topology of a distributed instances system 200 according to one embodiment. The instance processors 201 may be implemented as a number of instance processing nodes 201 each under the control of an instance manager 202. An instance storage 203 that holds instances during periods of inactivity as well as application states and message states. The instance processor provides reliable messaging and recoverability in the event of a system failure. However, either of these capabilities may be sacrificed if, for example, neither reliable messaging nor durable instances are required or desired.

The instance manager 202 is responsible for loading the instances' processing logic to the assigned instance processor 201. This allows the system to present a number of additional simplifying benefits to applications, including the capability to load different versions of processing logic and allowing the side-by-side execution of instance versions. For example, a business process that starts with version 1 of an instance's processing logic may continue to use that version, even when version 2 is created. New instances of the business process may automatically leverage the latest version.

Furthermore, the system's capability to represent a business process as a hierarchy of distinct yet coordinated instances significantly reduces the impact of changes to ongoing processes, thereby allowing application developers to model processes as a composition of independently versionable instances.

Figure 3:
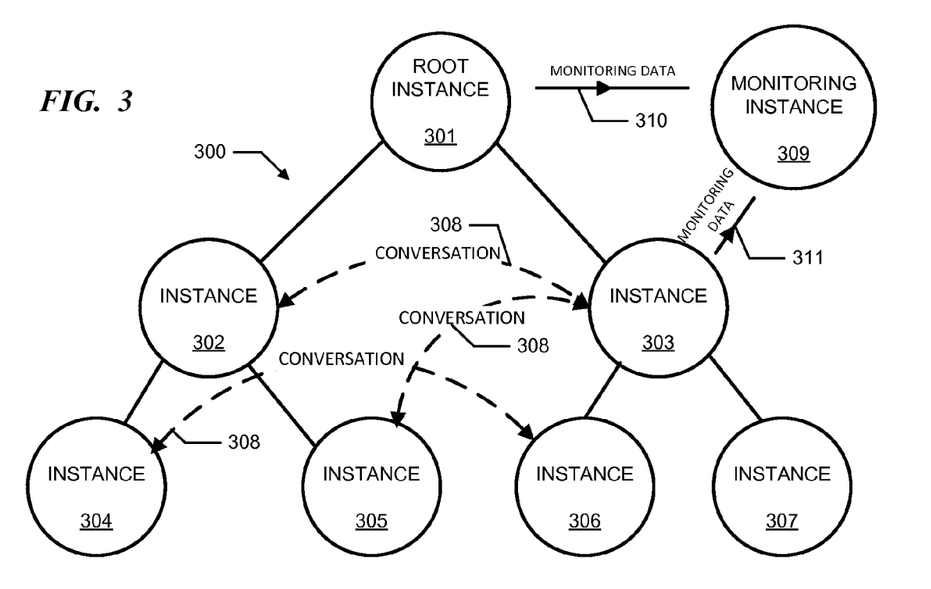
FIG. 3 illustrates a hierarchy of instances according to one embodiment.

FIG. 3 illustrates a hierarchy 300 of instances according to one embodiment. Root instance 301 created and is the parent to instances 302 and 303. In turn, instance 302 created and is the parent to instances 304 and 305, while instance 303 created and is the parent to instances 306 and 307.

Referring again to FIG. 1, instances 301-307 may be run on one or more instance processors 101. The instances 301-307 may all be running on the same instance processor 101 or may be spread across multiple instance processors 101. In a highly distributed application, each instance 301-307 may run on a separate instance processor 101. One or more of instances 301-307 may run on a separate distributed instance system that is in communication with distributed instance system 100 via external busses 105. Such external communication assumes bridging has been done between the protocol used on the external busses and the constrained message exchange patterns employed by the distributed instance system.

Any instance 301-307 may engage in a request-reply message exchange with any other instance 301-307. Any instance 301-307 may establish a conversation 308 with any other instance 301-307. One-way messages may be sent over the conversations 308 that have been established between instances.

Instances 301-307 form a hierarchy that rolls up to root instance 301. Monitoring information is transmitted up the hierarchy, and a monitoring instance 309 may subscribe to the monitoring data. Root instance 301 publishes the monitoring data 310 to monitoring instance 309. The monitoring data 310 is created by the application and represents the current state of the application. The monitoring data 310 flows up the hierarchy tree. The monitoring data is aggregated at each level so that instance 303 aggregates monitoring data for both instance 304 and 305 and root instance 301 aggregates monitoring data for both instance 301 and 303 and their respective child nodes. It will be understood that monitoring instance 309 is not limited to monitoring at a root instance, but may plug-in at any level. For example, monitoring instance 309 may alternatively receive monitoring data 311 from instance 303. Monitoring data 311 from instance 303 includes aggregated status and health data for instance 303 and its children, 306 and 307, while monitoring data 310 includes aggregated status and health data for all instances 301-207.

Hierarchy 300 may be expanded to any number of instances. There is an implicit conversation between a parent instance and its child instances, which allows the parent and children instances to communicate and to be aware of the state of related instances. Management of the instances is simplified by tying the lifetime of a child instance to its parent instance. The child instance cannot outlive its parent. Therefore, if an instance ends, all children of that instance are also ended. This provides an easy way to end and clean-up instances at all levels below the instance and allows the end user to treat the instances in a tree as one. In this way, processes may be broken up into a more manageable set of instances. If root instance 301 is ended, all instances in the hierarchy are ended.

Figure 4:
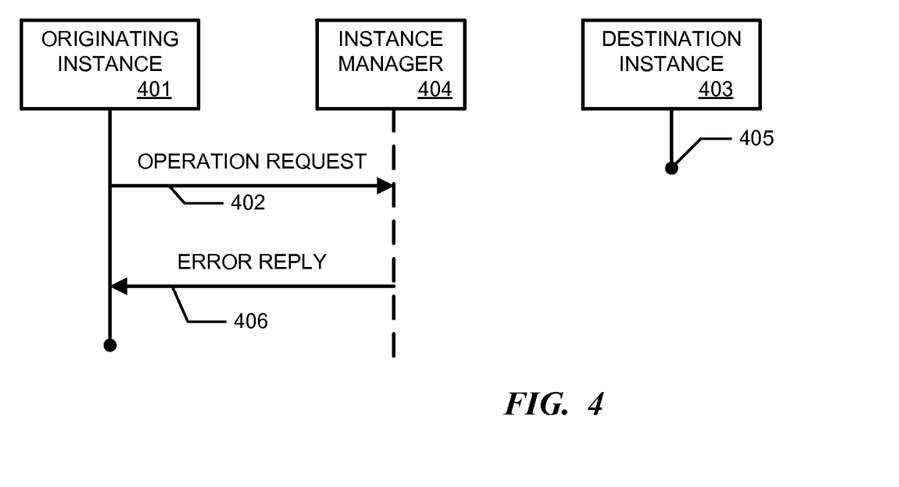
FIG. 4 illustrates a Request-reply Messaging Pattern for a request-reply exchange between two instances.

Scenario 1: FIG. 4 illustrates a Request-reply Messaging Pattern for a request-reply exchange between two instances. Originating instance 401 transmits an operation request 402 to destination instance 403. Request 402 is passed to instance manager 404, which is responsible for forwarding the request 402 to the destination instance 403. However, before instance manager 404 can pass the request message 402, the destination instance 403 ends (405). The instance manager 404 is aware of the lifetime of each instance 401, 403. Therefore, instance manager 404 knows that destination instance 403 has ended and that the operation request will never be routed to its destination. Accordingly, instance manager 404 sends an error reply 406 to the source instance 401 and eliminates request 402, thereby preventing request 402 from becoming an undeliverable letter and preventing originating instance 401 from becoming a suspended instance.

Figure 5:
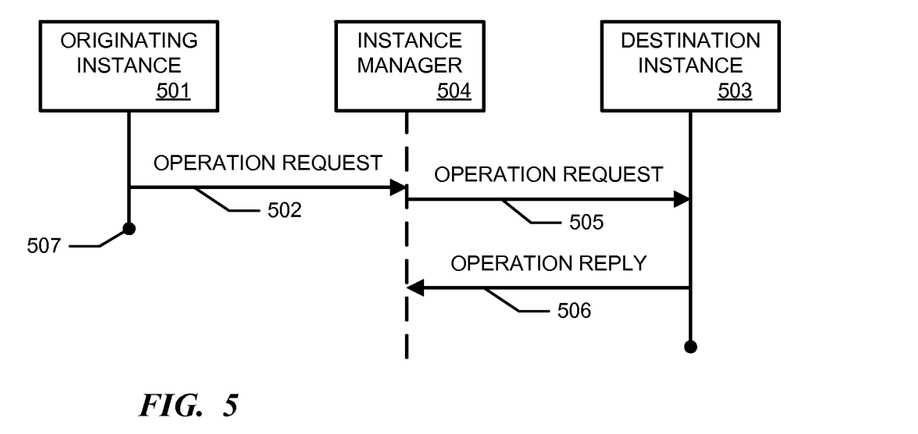
FIG. 5 illustrates another Request-reply Messaging Pattern for a request-reply exchange between two instances.

Scenario 2: FIG. 5 illustrates another Request-reply Messaging Pattern for a request-reply exchange between two instances. Originating instance 501 transmits an operation request 502 to destination instance 503. Request 502 is passed to instance manager 504, which is responsible for forwarding the request 502 to the destination instance 503 in message 505. Destination instance 503 receives the request 505 and generates operation reply message 506, which is sent back to originating instance 501 under the control of instance manager 504. However, before instance manager 504 can pass the reply message 506, the originating instance 501 ends (507). The instance manager 504 is aware of the lifetime of each instance 501, 503. Therefore, instance manager 504 knows that originating instance 501 has ended and that the operation reply 506 will never be routed to its destination. Since originating instance 501 has ended, the reply is no longer required or useful. Accordingly, instance manager 504 eliminates reply 506, thereby preventing reply 506 from becoming undeliverable.

Figure 6:
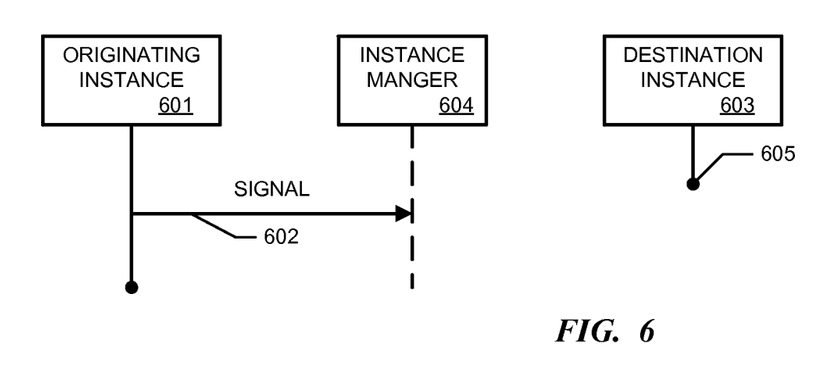
FIG. 6 illustrates a One-way Messaging Pattern for a one-way message between two instances.

Scenario 3: FIG. 6 illustrates a One-way Messaging Pattern for a one-way message between two instances. Originating instance 601 transmits signal 602 to destination 603. Signal 602 is a one-way message for which originating instance 601 does not expect a response. Instance manager 604 receives message 602, which should be forwarded to destination 603. However, destination instance 603 ends (605) before signal 602 can be delivered. Instance manager 604 is aware of the status of destination instance 605 and knows when the instance has ended. Accordingly, instead of holding signal 602 as undeliverable, instance manager 604 eliminates the signal. Because signal 602 was a one-way message and originating instance 601 did not expect a response or acknowledgment from destination instance 603, instance manager 604 simply terminates signal 602 and does not create further error messages or warnings to originating instance 601. This is a true one-way message exchange in which the originating instance only needs to know that the signal was sent and does not care if the signal was received. Therefore, the signal 602 can safely be discarded by instance manager 604 when the target instance is gone.

Figure 7:
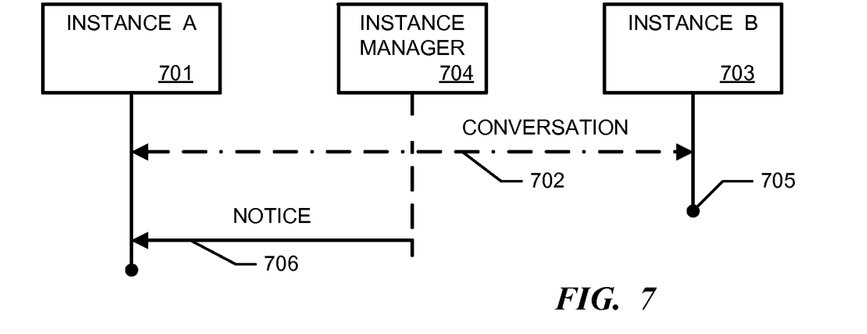
FIG. 7 illustrates a Conversation established between two instances.

Scenario 4: FIG. 7 illustrates a Conversation that is established between two instances. Instance A 701 establishes a conversation 702 with instance B 703 by registering an interest in instance B 703 with the instance manager 704. An instance may register interest in the other instance with a broker, an instance manager, or some other device. The conversation is established through a handshake involving both participating instances that is coordinated by the distributed instance system. Once the conversation 702 is established, instances 701, 703 may track the conversation and, therefore, may track the lifetime of the other instance. Either instance can establish the conversation. The conversation continues until canceled by one instance or until one instance ends. An instance that is about to end may notify the other instance that the conversation will die, or the instance manager may notify one instance that the other instance in a conversation has completed. For example, when instance B 703 ends (705), instance manager 704 may notify instance 701 using notice 706. Alternatively, when one instance recognizes that the conversation has unexpectedly terminated (i.e. without notice), that indicates that the other instance has ended.

A conversation may be used to support or enhance one-way messaging. For example, one instance to the conversation may send a signal to the other instance in the conversation. The sending instance does not require a reply to the one-way, signal message, but has knowledge as to whether the destination instance is alive when the message is sent and for some time after transmission. This life-status knowledge may be used by the sending instance to evaluate the likelihood of whether the signal was received by the destination instance. In particular, the sending instance may be waiting for an event that depends (directly or indirectly) on the receipt of the signal. The termination of the conversation tells the instance that the signal may have been lost, so it may choose to do something other than wait for the event.

Figure 8:
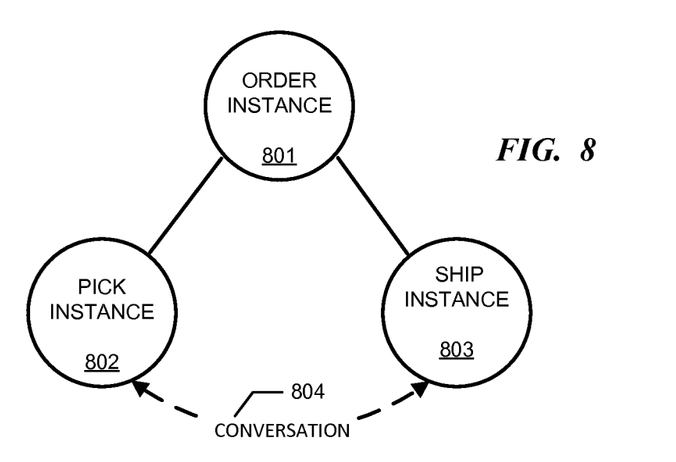
FIG. 8 illustrates a parent instance that has created two child instances of a different type.

The instance described herein may be of different types and may be associated with different processes. FIG. 8 illustrates a parent instance 801 that has created two child instances 802,803 of a different type. For example, in an ordering business process, order instance 801 may be created when a customer begins a new order. Order instance 801 may generate a pick child-instance 802 to provide an item-selection process to the customer. Order instance 801 may also generate a ship child-instance 803 to provide a shipping process for items selected by the customer.

The pick instance 802 and ship instance 803 may use Request-reply Messaging and One-way Messaging to exchange information to complete the customer's order. The pick instance 802 and ship instance 803 may also establish a conversation 804 to track the lifetime of the other instance.

Pick instance 802 and ship instance 803 may send monitoring messages to the parent order instance 801, which may in turn propagate the health information up a further tree of instances.

Order instance 801, pick instance 802 and ship instance 803 may be one of many independent order-instance trees that provide isolation among customers who are using a particular order process. This isolation may provide security to protect business process and personal customer information.

As one of many independent order-instance trees, order instance 801, pick instance 802 and ship instance 803 provide multiple, distributed order-processes that operate in a highly parallelized manner.

Many of the functions described herein may be implemented in hardware, software, and/or firmware, and/or any combination thereof When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

For example, in FIG. 1 storage 102 may be any volatile or non-volatile storage device, such as a hard drive, flash memory, solid state memory, optical disk, CD, DVD, computer program product, or other memory device, that provides computer-readable or machine-readable storage for instance processors 101. In other embodiments, the memory may be a virtualization of several physical storage devices, wherein the physical storage devices are of the same or different kinds. The code segments may be downloaded or transferred from storage 102 to instance processors 101 via an internal bus, another computer network, such as the Internet or an intranet, or via other wired or wireless networks, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A distributed instance system, comprising:
   one or more instance processors configured to run instances of one or more processes; and
   one or more instance managers distinct from the one or more instance processors and configured to exchange one or more control messages with the one or more instance processors to create and terminate at least a first and a second instance, the one or more instance managers further configured to:
   ascertain a lifetime of the first or second instance based, at least in part, upon the one or more control messages;
   receive a message transmitted by the first instance to the second instance;
   identify one of a plurality of exchange patterns to which the message belongs; and
   determine how to handle the message based upon: (a) the lifetime of the first or second instances, and (b) the identified exchange pattern.

2. The distributed instance system of claim 1, further comprising:
   a storage device configured to hold one or more instance state.

3. The distributed instance system of claim 1, further comprising:
   a storage device configured to hold one or more instance state and one or more messages.

4. The distributed instance system of claim 1, wherein the identified exchange pattern is a request-response pattern, the message is a request message, and the one or more instance managers are configured not to attempt to deliver the request message to the second instance in response to the lifetime of the first instance having expired, without user intervention.

5. The distributed instance system of claim 1, wherein the identified exchange pattern is a request-response pattern, the message is a request message, and the one or more instance managers are configured not to attempt to deliver the message to the second instance and to transmit an error message to the first instance in response to the lifetime of the second instance having expired, without user intervention.

6. The distributed instance system of claim 1, wherein the identified exchange pattern is a request-response pattern, the message is a response message, and the one or more instance managers are configured not to attempt to deliver the response message to the second instance in response to the lifetime of the second instance having expired, without user intervention.

7. The distributed instance system of claim 1, wherein the first instance is configured to initiate a conversation with the second instance using a handshake involving both instances that is coordinated by the distributed instance system, and wherein an instance participating in the conversation is configured to be notified when the other instance in the conversation has ended.

8. The distributed instance system of claim 1, wherein one or more parent instances are configured to generate child instances, and wherein the child instances are configured to send status updates to their respective parent instances.

9. The distributed instance system of claim 8, wherein one or more child instances are configured to operate as parent instances and generate further child instances to create a hierarchical instance structure, and wherein each parent instance is configured to aggregate the status updates for respective child instances before passing an aggregated status report to a higher level parent instance.

10. The distributed instance system of claim 8, wherein a monitoring instance is configured to receive receiving the status reports from an instance.

11. A method for managing a plurality of instances, comprising:
   monitoring a lifetime of each of a plurality of instances running on one or more instance processors based upon one or more control messages transmitted by an instance manager to the one or more instance processors, the instance manager distinct from the one or more instance processors, the one or more control messages creating and terminating each of the plurality of instances;

receiving a message transmitted by a sending instance to a destination instance;

identifying one of a plurality of exchange patterns to which the message belongs; and handling the message based upon: (a) the lifetime of the sending or destination instances, and (b) the identified exchange pattern.

12. The method of claim 11, further comprising:

providing a request-reply message format for communication between the sending instance and the destination instance, the message being a request message;

determining that the lifetime of the destination instance has ended before receipt of the request message; and automatically eliminating the request message.

13. The method of claim 12, further comprising:

transmitting an error message to the sending instance without attempting to transmit the request message to the destination instance.

14. The method of claim 11, further comprising:

providing a request-reply message format for communication between the sending instance and the destination instance, the message being a request message;

determining that the lifetime of the sending instance has ended before receipt of a reply to the request message; and automatically eliminating the reply.

15. The method of claim 11, further comprising:

providing a one-way message format for communication between the sending instance and the destination instance, the message being a one-way message;

identifying when the destination instance has ended before receipt of the one-way message; and automatically eliminating the one-way message.

16. The method of claim 11, wherein the plurality of instances are arranged in a hierarchical manner in which instances are arranged in multiple levels of parent-child groups, the method further comprising:

sending instance status information from children instances to a parent instance;

aggregating instance status information for the children instances at the parent instance; and sending aggregated status information from the parent instance to a higher parent instance.

17. A method, comprising:

initiating a plurality of instances on one or more instance processors via an instance manager distinct from the one or more instance processors, wherein the plurality of instances communicate with one another using predefined sets of messages;

monitoring, via the instance manager, a lifetime of each of the plurality of instances, wherein the instance manager creates and terminates each of the plurality of instances using one or more control messages, and wherein the monitoring is based upon the one or more control messages;

receiving a message sent among the plurality of instances;

identifying the message as complying with a given one of the predefined sets of messages; and processing the message based upon: (a) the lifetime of one or more of the plurality of instances, and (b) the given one of the predefined sets of messages.

18. The method of claim 17, further comprising:

providing a request-reply message format for communication between sending instances and destination instances;

identifying when a destination instance has ended before receipt of a request message;

automatically eliminating the request message;

identifying when a sending instance has ended before receipt of a reply message; and automatically eliminating the reply message.

19. The method of claim 17, further comprising:

providing a one-way message format for communication between sending instances and destination instances;

identifying when a destination instance has ended before receipt of a one-way message; and automatically eliminating the one-way message.

20. The method of claim 17, further comprising:

arranging the plurality of instances in a hierarchical format in which instances are arranged in multiple levels of parent-child groups;

sending instance status information from children instances to a parent instance;

aggregating instance status information for the children instances at the parent instance;

sending aggregated status information from the parent instance to a higher parent instance.

* * * * *